United States Patent [19]

Leorat et al.

[11] Patent Number: 4,664,137
[45] Date of Patent: May 12, 1987

[54] TWO-LEVEL PRESSURE CONTROL DEVICE

[75] Inventors: Francois Leorat, Versailles; Patrick Coutant, Rueil Malmaison; Paul Aubert, Clamart, all of France

[73] Assignee: Regie Nationale des Usines Renault, Boulogne-Billancourt, France

[21] Appl. No.: 777,325

[22] Filed: Sep. 18, 1985

[30] Foreign Application Priority Data

Sep. 18, 1984 [FR] France .................. 84 14260

[51] Int. Cl.$^4$ ............................................ G05D 16/10
[52] U.S. Cl. ............................ 137/118; 137/505.12
[58] Field of Search ............... 137/118, 505.12, 505.11, 137/84, 503, 505.42

[56] References Cited

U.S. PATENT DOCUMENTS

| 1,233,885 | 7/1917 | Kuenhold | 137/505.11 |
|---|---|---|---|
| 1,957,972 | 5/1935 | Mills | 137/505.12 |
| 2,679,207 | 5/1954 | Mategorin | 137/118 |
| 3,217,726 | 11/1965 | Rohweder et al. | 137/505.12 X |
| 3,264,650 | 8/1966 | Armstrong | 137/82 X |
| 3,517,681 | 6/1970 | Davidson | 137/505.18 |
| 3,812,873 | 5/1974 | Laakaniemi et al. | 137/84 |
| 4,192,337 | 3/1980 | Alderson et al. | 137/118 X |
| 4,279,268 | 7/1981 | Aubert | 137/509 X |

FOREIGN PATENT DOCUMENTS

| 0009749 | 4/1980 | European Pat. Off. |
|---|---|---|
| 1159231 | 6/1958 | France . |
| 57-146960 | 9/1982 | Japan . |

Primary Examiner—Martin P. Schwadron
Assistant Examiner—Stephen M. Hepperle
Attorney, Agent, or Firm—Oblon, Fisher, Spivak, McClelland & Maier

[57] ABSTRACT

Two-level pressure control device has a pressure control valve VLP 3 associated with a system of jets and in series to obtain a first reference pressure level $P_1$ and a second reference pressure level $P_2$.

2 Claims, 2 Drawing Figures

TWO-LEVEL PRESSURE CONTROL DEVICE

BACKGROUND OF THE INVENTION

1. Field of the Invention

This invention relates to a two-level pressure control device having a single control valve.

2. Related Art

Numerous more or less complex pressure control devices making it possible to obtain two pressure levels are known. The aim of this invention is to propose a device having a minimum of parts and which is easily assembled, which makes it possible to easily obtain two pressure levels.

SUMMARY OF THE INVENTION

According to the invention, the two-level pressure control device includes a pressure control valve associated with a system of jets or restrictions placed in series to obtain a first reference pressure level and a second reference pressure level.

According to an embodiment of the invention, the two-level pressure control device includes a pressure control valve which has a control spool with a return spring to obtain a first reference pressure level and a second reference pressure level. According to an embodiment of the invention, the spool of the pressure control valve is of symmetrical design. The invention thus offers the advantage of obtaining with a simple structure and by an assembly that avoids any error, a control device that provides two pressure levels.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
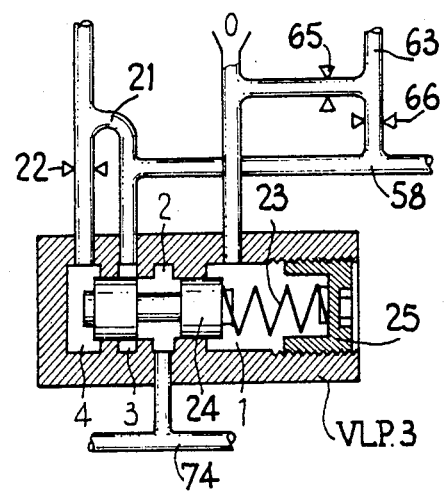
FIG. 1 shows the device according to an embodiment of the invention in section.

The control device according to the invention consists of a hydraulic circuit which includes a pressure control valve (VLP 3). The hydraulic circuit is part of a larger circuit described in Applicants' copending U.S. patent application Ser. Nos. 777,326 and 777,444, respectively entitled "Two Range Pressure Control System" and "Control System for a Four Speed Automatic Transmission", both filed on the same date as the present application and hereby incorporated by reference.

Pressure control valve VLP 3 has a spool 24, which, together with the body of the control valve, defines four chambers 1, 2, 3 and 4. A spring 23 biases slide 24 to the left and rests on a threaded plug 25.

The output pressure of a feed pump (not shown in the Figures) of the hydraulic circuit is introduced into chamber 2 by duct 74. Spool 24 is of symmetrical design. The controlled pressure, prevailing in an output duct 21 enters chamber 3 and is also introduced into chamber 4 through a damping jet or restriction 22, thus balancing the thrust of spring 23 on the other end of slide 24. The reference pressure $P_1$ thus controlled has a value fixed by the force of spring 23 which can be adjusted by screw plug 25 screwed in the body of valve VLP 3.

To duct 21 is connected an output duct 58 to which is connected an output duct 63. A hydraulic potentiometer, made up of calibrated jet or restriction 65 in a bypass connection between duct 58 where reference pressure $P_1$ prevails, and 0 (zero pressure), and jet 66 in duct 63, creates an intermediate reference pressure $P_2$ in duct 63.

The flow rate of the hydraulic potentiometer, made up of jets 65 and 66, creates a flow in the controlled pressure circuit and pressure $P_1$, which improves the control operation of pressure control valve VLP 3.

Figure 2:
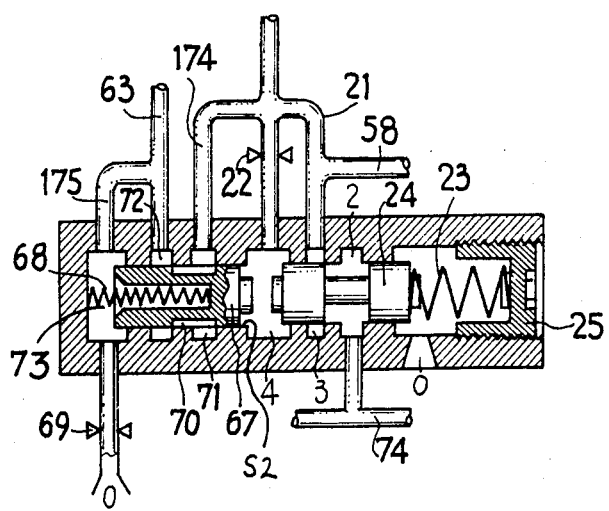
FIG. 2 shows the device in section in a second embodiment of the invention.

An alternative arrangement for generating pressure $P_2$ is shown in FIG. 2. The bore of valve VLP 3 having section $S_2$ is extended so that it can receive an additional control spool 67. The body of this spool is hollow so that a return spring 68, calibrated at a force $F'$, can be housed therein. Pressure $P_1$ acts on the right end of this spool 67. Moreover, pressure $P_1$ is brought by a duct 174, which connects to duct 21, into the chamber 71 of spool 67. The diameter of the body of spool 67 is reduced at chamber 71 to form a cylindrical narrowing 70, thus creating, at right angles to chamber 72, a control lip making it possible to generate pressure $P_2$ in chamber 72 and consequently in duct 63. Actually pressure $P_2$ is introduced by duct 175 into chamber 73, so that the equilibrium equation of spool 67 is written:

$$P_2 \cdot S_2 + F = P_1 \cdot S_2, \text{ or } P_2 = P_1 - F/S_2$$

Finally, chamber 73 is connected to 0 (zero pressure) by a small-diameter jet 69. This makes it possible to create a constant control flow favorable to a good operation of spools 24 and 67. The control unit constituted by spool 67 and its associated chambers takes the place of the pressure divider defined by calibrated jets 65 and 66, and is connected to the rest of the hydraulic circuit by ducts 21, 58, 63 and 74, already mentioned.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A two-level pressure control device comprising:
   a pressure control valve having at least a first spool slidable therein;
   first spring means for biasing said spool in a first direction;
   means for supplying hydraulic pressure to said first spool in a direction in opposition to said first direction, whereby movement of said first spool will maintain said hydraulic pressure at a first reference pressure; and
   means providing a second reference pressure different from said first reference pressure and varying as a function of said first reference pressure, wherein said means for providing a second reference pressure comprises:
   (a.) a second spool in said valve;

(b.) means for supplying said first reference pressure to said second spool for moving said second spool in a second direction;
(c.) second spring means for biasing said second spring in a direction opposite said second direction;
(d.) means for supplying hydraulic pressure to said second spool for moving said second spool in said direction opposite said second direction, whereby movement of said second spool will maintain said hydraulic pressure supplied for moving said second spool in said direction opposite said second direction at said second reference pressure; and
(e.) means having a restriction for communicating said hydraulic pressure supplied for moving said second spool in a direction opposite said second direction with a region at zero pressure.

2. The device of claim 1 wherein said first spool is of a symmetric design.

* * * * *